United States Patent Office 3,030,120
Patented Apr. 17, 1962

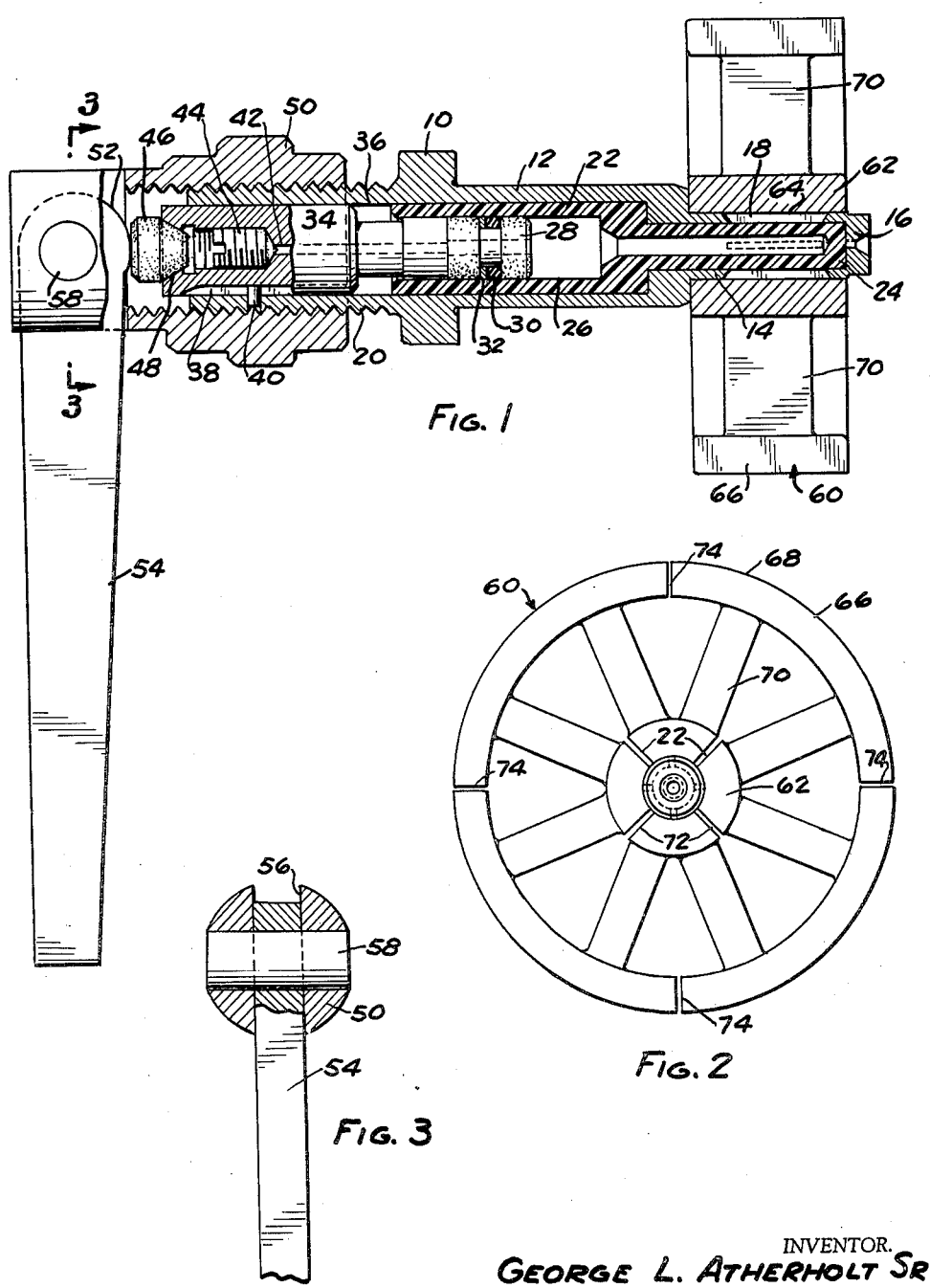

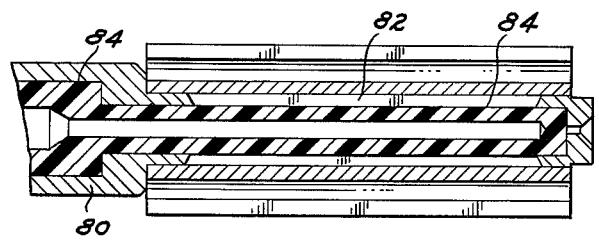
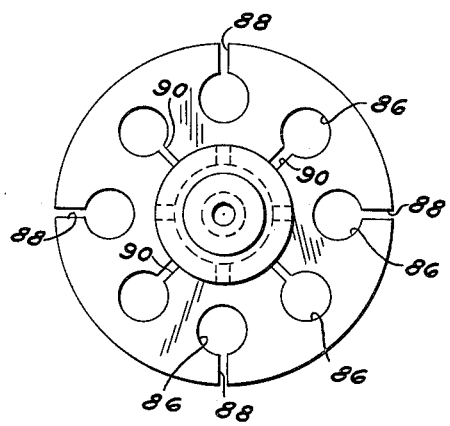

3,030,120
HYDRAULICALLY EXPANSIBLE ARBOR
George L. Atherholt, Sr., Warren, Mich., assignor to A & C Engineering Co., Warren, Mich., a corporation of Michigan
Original application Aug. 16, 1957, Ser. No. 678,594, now Patent No. 2,971,765, dated Feb. 14, 1961. Divided and this application Feb. 6, 1961, Ser. No. 87,391
6 Claims. (Cl. 279—46)

This invention relates to hydraulically expansible arbors of the type such as may be utilized for positioning gaging devices in bores of a part which has been machined in order to check the positional relationship of the bore with other surfaces of the part.

This application is a division of my co-pending application Serial No. 678,594, filed August 16, 1957, and now issued into Patent No. 2,971,765.

It is an object of the present invention to provide an improved arbor of this type which may be hydraulically expanded into engagement with a bore with a high degree of accuracy as to the concentricity of the expansible portion with the other cylindrical parts of the arbor.

A further object is to provide an arbor of this class having an adaptor which may enable the arbor to be utilized with bores of various diameters by substituting variously sized adaptors.

A further object is to provide an expansible adaptor suitable for use with an expansible arbor which enables a high degree of accuracy and concentricity to be maintained.

In the drawings:

FIGURE 1 is a longitudinal sectional view of an expansible arbor and adaptor incorporating a preferred form of the present invention.

FIGURE 2 is an end view of the arbor and adaptor shown in FIGURE 1.

FIGURE 3 is a cross section on line 3—3 of FIGURE 1.

FIGURE 4 is a sectional view of a modified form of the adaptor.

FIGURE 5 is an end view of the modified form of adaptor shown in FIGURE 4.

In the arbor shown in FIGURE 1, there is provided a main body member 10 which has a relatively thick walled portion 12 joined to a thin walled portion 14. Portion 12 has an external surface of cylindrical shape for mounting in a suitable gage device, not shown. The end of the portion 14 is substantially closed by an end wall 16 while the portion 14 itself may be rendered readily expansible by the formation of a plurality of slots 18 therein extending axially. The body 10 is provided with an externally threaded extension 20 at its left-hand end.

Mounted within the interior of the body 12 is a liner 22 which is of unitary construction, having its left end open and its right end closed at 24. The liner is preferably formed of a synthetic plastic material of high strength and having elastic properties. Suitable materials for this purpose include nylon and the fluorocarbon materials known as "Teflon" and "Kel–F."

Slidable within the internal bore 26 of the liner 22 is a piston 28 having an O-ring seal 30 preferably with a leather back-up ring 32. The piston 28 has an enlarged portion 34 at its left-hand end which is slidable in a bore 36. The portion 34 may be provided with a keyway 38 and a pin 40 may be mounted in the extension 20 to prevent rotation of the piston 28. A filling passage 42 extends centrally through the piston 28 and is closed by a cone pointed set screw 44. A plastic sealing block 46 which may also be formed of material similar to the liner seats upon a conical seat 48 at the left-hand end of piston 28.

For the purpose of operating the piston 28, there is provided a pair of piston actuators one of which comprises a nut 50 threaded on the extension 20. The other actuator comprises an oscillatable cam 52 which is formed on the end of an operating lever 54. The lever 54 and the cam 52 are pivoted in a slot 56 (FIGURE 3) by means of a pivot pin 58.

Removably mounted on the thin walled portion 14 is an adaptor member 60 which is representative of a number of adaptors having various external diameters which may be mounted in a similar position. The adaptor comprises an inner series of annular segments 62 which together form an inner cylinder surface 64 which fits upon the thin-walled portion 14. A second series of annular segments 66 together form an outer cylindrical surface 68 which is adapted to be mounted in a bore. These segments 62 and 66 are staggered circumferentially as shown in FIGURE 2 and are connected by radially extending spokes 70. It will be seen that there are as many spokes as the total number of segments 62 and 66 and that each segment is connected by two spokes with two segments of the other series. Thus, the device may partake of radial expansion while maintaining a generally cylindrical inner and outer surface. During such expanding action, the gaps shown at 72 and 74 will open and during contraction they will close, the whole structures remaining integrally united by the spokes 70.

In operation, with the parts in the position illustrated in FIGURE 1 and with the cylinder 26 and the remaining interior space within the liner 22 filled with oil or grease, the lever 54 may be utilized to operate the threaded nut 50 to force the piston 28 inwardly and cause expansion of the thin-walled portion 14. The liner 22 serves as a fluid tight seal to bridge the gaps formed by the slots 18. The lever 54 may also be swung about the pivot pin 58 to actuate the piston 28 by means of the cam 52. Preferably the mechanical advantage obtained by the latter operation is either greater or less than the mechanical advantage obtained by rotating nut 50. Thus, if it is greater, normal operation of the piston 28 may be by actuation of cam 52 back and forth to expand and contract and the rotary position of nut 50 may be selected so that the lever 54 cams to its "home" position with the desired amount of expansion of the portion 14. If it is lesser, the opposite relationship will exist.

It will be seen that the present invention provides an improved expansible arbor in which a fluid tight seal is readily maintained within the expansible portion of the arbor which may be formed of steel and may be slotted as desired to provide substantial amounts of expansion. The actuation of the piston is readily obtained by a simple lever action which controls both the cam and the thread for piston actuation. Likewise by the use of a series of adaptors 60, the same hydraulically expansible arbor may be utilized to fit holes of various diameters and to maintain a high degree of accuracy and concentricity in the location of the arbor.

In FIGURES 4 and 5 a modified type of adaptor is shown where it is important to have a smaller diameter than that shown in FIGURE 2. As shown in FIGURE 4, the expanding mandrel 80 has the expansion end 82 with the liner member 84 projecting into the expanding end; and the adaptor is shown as a cylinder having an even number of axial holes 86 spaced circumferentially around the adaptor about half way between the inner diameter and the outer diameter. Every other hole 86 is then opened to the outer diameter by an axial slot 88, and the alternate holes are opened to the inner diameter by an axial slot 90. Thus, an unusual amount of equal expansion can be obtained on the outer diameter without undue strain on the metal of the adaptor.

I claim:

1. An adaptor for an expansible arbor comprising a body having generally cylindrical inner and outer surfaces and comprising a first series of annular segments providing the inner surface and second series of annular segments radially spaced from the first segments and providing the outer surface, and a plurality of spokes extending between the first and second series of segments.

2. An adaptor for an expansible arbor comprising a body having generally cylindrical inner and outer surfaces and comprising a first series of annular segments providing the inner surface and second series of annular segments radially spaced from and in circumferentially staggered relation to the first segments and providing the outer surface, and a plurality of spokes extending between the first and second series of segments.

3. An adaptor for an expansible arbor comprising a body having generally cylindrical inner and outer surfaces and comprising a first series of annular segments providing the inner surface and second series of annular segments radially spaced from and in circumferentially staggered relation to the first segments and providing the outer surface, and a plurality of spokes equal to the total number of segments extending between the first and second series of segments.

4. An adaptor for an expansible arbor comprising a body having generally cylindrical inner and outer surfaces and comprising a first series of annular segments providing the inner surface and second series of annular segments radially spaced from and in circumferentially staggered relation to the first segments and providing the outer surface, and a plurality of spokes equal to the total number of segments extending between the first and second series of segments, each segment of one series being connected by spokes to two segments of the other series.

5. An adaptor for an expansible arbor comprising a body having a generally cylindrical shape with inner and outer surfaces, an even number of circumferentially spaced axial passages between the inner and outer surfaces extending from one end to the other of said body, a plurality of slots extending from alternate passages to the outer surface of said body, and a plurality of slots extending from the alternate passages to the inner surface of said body wherein expansion forces on the inner surface are transmitted equally and concentrically to the other surface.

6. An adaptor for an expansible arbor comprising a body having generally cylindrical inner and outer surfaces, a plurality of axial passages extending from one end of said body to the other between said surfaces, and a plurality of slots connecting alternate passages in said body with the inner and the outer surfaces of said body, said slots extending the total distance between the ends of said body wherein expansion forces on the inner surface of said body are transmitted equally and concentrically to the outer surface.

References Cited in the file of this patent

UNITED STATES PATENTS

| | | |
|---|---|---|
| 2,695,787 | Sunnen | Nov. 30, 1954 |
| 2,707,108 | Schottler | Apr. 26, 1955 |
| 2,971,765 | Atherholt | Feb. 14, 1961 |